Sept. 20, 1971   HIROSHI MINEGISHI   3,606,355

SPACER EXPANDER

Filed Aug. 5, 1969

United States Patent Office 3,606,355
Patented Sept. 20, 1971

3,606,355
SPACER EXPANDER
Hiroshi Minegishi, Kawagoe-shi, Japan, assignor to Nippon Piston Ring Co., Ltd., Tokyo, Japan
Filed Aug. 5, 1969, Ser. No. 847,651
Int. Cl. F16j 9/06
U.S. Cl. 277—140
4 Claims

ABSTRACT OF THE DISCLOSURE

A channel type spacer expander is used with a pair of side rails as a piston ring of an internal combustion engine and takes the form of a discontinuous circle composed of a plurality of equally-spaced unitary channels having a C-shaped cross-section and is provided with a pair of projections at the outer edges thereof and a plurality of U-shaped bent portions, each disposed between the adjacent unitary channels. The connecting portion between the unitary channel and the U-shaped bent portion has curved edges to reinforce the connection therebetween. A pair of projections protrude on the opposite sides of the closed portion to prevent the associated side rails from deflecting in excess of 0.1 mm. The whole surface of the spacer expander is chrome-plated and/or the inner and outer peripheral surfaces of the associated side rails are then coated with poly-tetra-fluoride-ethylene to provide better mechanical properties.

BACKGROUND OF THE INVENTION

Piston rings having higher tension are required in the recent development of the higher speed internal combustion engines and conventional cast iron rings can not satisfy the requirement.

The tensile strength of cast iron is limited to a certain value which is unsatisfactory to obtain a piston ring having a high tensile strength and a piston ring of cast iron can not contact the cylinder wall with a pressure sufficient to assure high speed operation of the internal combustion engine. Particularly, when such tensile strength of an oil ring is lacking, the oil scraping operation of the ring is not performed sufficiently, resulting in the oil lacking phenomenon. In this connection, an oil ring having a high tensile strength and high resiliency throughout the periphery thereof, capable of receiving a high pressure in the axial direction and stable under pressure conditions is employed in place of the cast steel ring. The oil ring is composed of a pair of side rails with a spacer expander of thin steel plate disposed therebetween. The spacer expander is formed by bending the steel plate to form a channel having a C-shape in cross-section and rendering the channel in a circle to form a discontinuous annular ring which is provided with a plurality of equally spaced slits therealong. Such spacer expander is referred to as a channel type due to its shape in cross-section.

BRIEF EXPLANATION OF THE INVENTION

The present invention relates to such channel type spacer expander adapted for use in combination with a pair of side rails to form a piston ring for an internal combustion engine.

According to the present invention, the novel spacer expander is formed by punching out a desired shape from a thin steel plate, bending the punched-out plate along the lengthwise direction to form a channel having a C-shape in cross-section which extends lengthwise and mating the opposite ends of the channel with a small gap to form a discontinuous annular channel provided with a plurality of equally-spaced pairs of upper and lower pressure receiving surfaces and a plurality of U-shaped, intermediate bent portions, each disposed between the adjacent pairs and so formed by bending it into the interior of the circle on the periphery of the circle. The spacer expander is characterised by a certain curvature for its edges in the connecting portion between the intermediate bent portion and the pair of upper and lower pressure receiving surfaces to prevent the connecting portion from breaking. The starting position of the curve of the connecting portion lies inside of the bending line of the upper and lower pressure receiving surfaces and the terminating position of the curve lies outside of the bending line of the intermediate bent portion. A pair of projections are provided on the center portion of the intermediate bent portion to prevent the side rails from deflecting in excess of 0.1 mm.

DETAILED EXPLANATION OF THE PRESENT INVENTION

Figure 1:
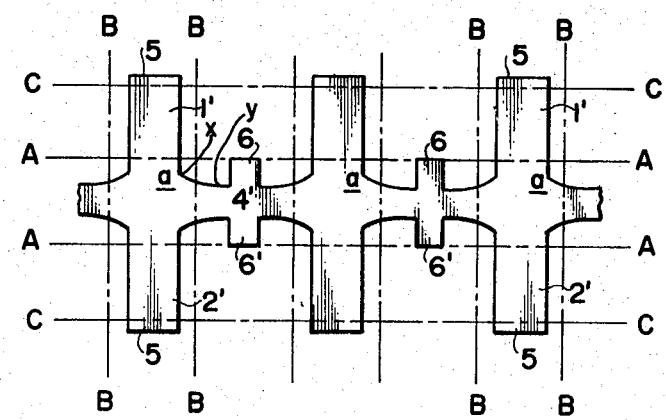
FIG. 1 is an enlarged plan view of a portion of a fundamental thin steel plate prior to forming the present spacer expander.
Figure 2:
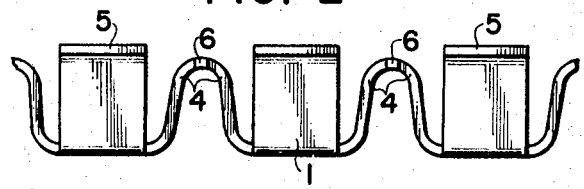
FIG. 2 is a plan view of a portion of the present spacer expander.

In explaining the process for forming the present spacer expander, a plurality of wide and generally U-shaped portions B—B are punched out symmetrically from the opposite sides of the thin steel plate in such a way that a plurality of equally spaced rectangular side plates 1' and 2' are formed on and along the opposite sides of the steel plate symmetrically with the axis of the plate. A plurality of central rectangular plates 4' are each provided with a pair of projections 6 and 6' which project in opposite directions from the opposite sides of the central rectangular plate and are provided at the center portions of the closed portions of the wide and U-shaped punched out portions respectively, as shown in FIG. 1. The resulting thin steel plate is bent in such a way that the respective rectangular side plates 1' and 2' are bent 90° along predetermined bending lines A—A in the same direction to form a C-shape in cross-section, which shape is composed of a pair of upper and lower pressure receiving side surfaces 1 and 2 and a vertical peripheral surface 3. The outer edge portion 5 of respective rectangular plates 1' and 2' are bent at a predetermined bending line C—C outwardly from the channel. The C-shaped channel is further worked in such a way that the central rectangular portion 4' is bent at a predetermined bending line B—B to form a U-shaped bent portion whose closed bottom portion is on the same side as the projection 5. A suitable length of the resulting thin steel plate is cut to form a discontinuous ring in which the edge projections 5 and 5' are disposed on the inner periphery thereof. Thereafter, the ring is heat-processed to regulate the mechanical properties thereof and thus the present spacer expander is provided. A pair of side rails are associated with the spacer expander in such a way that the side surfaces 1 and 2, adapted to receive pressures, carry the side rails respectively and the combination of the spacer expander and the side rails is inserted in a piston ring groove G provided on the outer peripheral surface of a piston as an oil ring, FIG. 4, in which the upper and lower edge projections 5 and 5' push on the side rails to render their outer peripheries thereof, in intimate contact with the inner wall of a cylinder.

A spacer expander similar to the present space expander is disclosed in both Japanese Utility Model Publication No. 23,502/1962 and United States Patent No. 3,081,101. However, both of them have disadvantages that the connecting portion a between each pair of upper and lower pressure-receiving surfaces 1 and 2 and a U-shaped intermediate portion formed by bending the intermediate portion 4 between the adjacent pairs of the pressure-receiving surfaces is easily broken and the axial deflection of the side rails on the respective pressure-receiving surfaces 1 and 2 is apt to exceed 0.1 mm. in the ring groove. Due to these distadvantages, the pressure applied to the inner wall of the cylinder S by the side rails is apt to decrease. Thus, these prior art rings have inherent defects wherein, in the assembling and/or operating or internal combustion engine, the consumption of lubricating oil is increased and the wear of the contacting portions of the side rails with the respective pressure-receiving surfaces is also increased.

The spacer expander in accordance with the present invention eliminates the above-described disadvantages which are inherent to the prior art spacer expander and/or the combination of the spacer expander and the side rails employed as an oil ring, with simple and unexpensive constructive features.

According to the present invention, a thin steel plate is punched out in a desired shape, bent to form a channel having a C-shape in cross-section, then formed into a discontinuous ring, provided with a plurality of equally-spaced pairs of upper and lower side surfaces 1 and 2 and thereafter a U-shaped intermediate bent portion 4 is formed between the adjacent pairs of pressure-receiving side surfaces by bending the intermediate portion into the interior of the ring. A certain curvation is introduced to the connecting portion a connecting the intermediate portion 4 with the pair of pressure-receiving surfaces 1 and 2 to increase the strength of the portion a to an extent sufficient to prevent the breaking thereof.

More particularly, the starting position x of each curve provided to the edges of connecting portion a is adjacent to and inside of the transverse bending line A—A and the terminating position y lies outside of the longitudinal bending line B—B of the intermediate portion 4.

Figure 3:
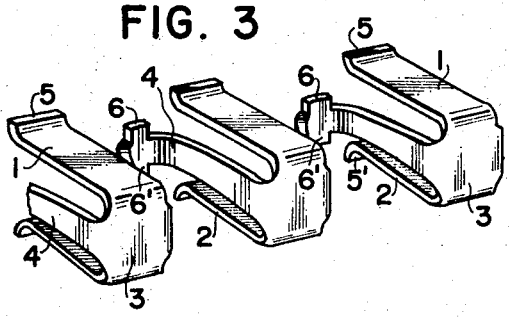
FIG. 3 is a perspective view of a portion of the spacer expander of FIG. 2.
Figure 4:
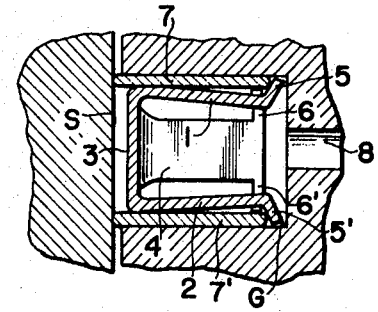
FIG. 4 is a cross-sectional view of the present spacer expander when, with a pair of side rails, it is used as an oil ring and positioned in a ring groove.
Figure 5:
FIG. 5 is a cross-sectional view of an embodiment of a side rail of the present invention.

And, as shown in FIGS. 3 and 4, a pair of projections 6 and 6' are provided symmetrically at the center portion of the intermediate bending portion 4 to limit the deflection of the side rails 7 and 7' in the ring groove G to less than 0.1 mm. by supporting the rails 7 and 7' when the deflection reaches to the value.

In this connection, it is noted that the edges of projections 6 and 6' move into pressure-contact with the side rails 7 and 7' only when they tend to deflect in excess of 0.1 mm. to prevent the above deflection under the condition which the space expander is inserted in the ring groove G, as shown in FIG. 4.

Also, the projection 6 and 6' are positioned radially outwardly from the edge projections 5 and 5' provided on inner peripheral edge of the upper and lower surfaces 1 and 2 of the side rails for urging the latter.

In this figure, 8 is an oil hole of the piston.

As explained previously, since the spacer expander of the present invention is formed by making the channel of steel plate a discontinuous circle, the circle itself has high tensile strength and high resiliency and is maintained sufficiently stable by means of the respective pairs of the upper and lower pressure-receiving side surfaces, and, therefore, the present spacer expander satisfies the previously-described requirement for the recent high speed internal combustion engines.

In addition to this, by providing a hard chrome plating on the whole surface of the spacer expander of the present invention, the friction between the upper and lower pressure-receiving side surfaces and corresponding portions of the side rails contacting the same is remarkably decreased, thereby not only decreasing, correspondingly, the wear of these portions and increasing the conformability of the oil ring of this type to the cylinder wall, but also increasing the flow rate of the oil passing through the present spacer expander. Thus, the deposition of carbon sludge contained in the oil on the spacer expander, which is unavoidable in the conventional ring, can be effectively prevented.

Further, by providing a hard chrome plating on the inner and outer peripheral surfaces of the respective side rails and further coating the hard chrome layer with poly-tetra-fluoride-ethylene resin, the abrasion of the inner and outer peripheral surfaces is decreased and also a better initial fitting of the side rails to the associated members (cylinder wall and projections) can be obtained, thereby effectively rendering the functions of the surfaces of the side rails in contact with the cylinder wall and the projections of the present spacer expander stable.

Since, by using the spacer expander in accordance with the present invention, the assembly of the expander itself becomes simple and the operational defects inherent to the conventional device can be eliminated, the advantages resulted from the present invention is quite applicable to practical use.

What is claimed is:

1. In a spacer expander formed from thin steel plate, having a discontinuous circular channel configuration of generally C-shape in cross-section, and having plural pairs of upper and lower pressure-receiving surfaces located along the circle in equally-spaced relation for use with a pair of side rails as a piston ring, the improvement comprising: U-shaped, intermediate bent portions each formed by bending the intermediate portion between adjacent pairs toward the interior of the circle, connecting portions each connecting said intermediate bent portion and said pair and having curved edges, and plural pairs of projections, each pair of which is provided on the center portion of said intermediate bent portion and extending outwardly from opposite edges, toward respective pressure receiving surfaces.

2. A spacer expander as set forth in claim 1, wherein the starting point of said curve of said connecting portion is adjacent to the transverse bending line of said pressure-receiving side surface and outside of said side surface, the terminating point of said curve is outside of the longitudinal bending line of said intermediate bent portion, and said projections are adapted to prevent a deflection of said side rail in excess of 0.1 mm.

3. A spacer expander as claimed in claim 1, wherein the whole surface of said spacer expander is chrome-plated.

4. A piston ring composed of a pair of side rails and a spacer expander, as claimed in claim 1, wherein the inner and outer peripheral surfaces of each of said side rails are chrome-plated and then coated with poly-tetra-fluoride-ethylene resin.

References Cited

UNITED STATES PATENTS

| 2,807,511 | 9/1957 | Fleming | 277—235A |
| 3,081,101 | 3/1963 | Marien | 277—140 |

FOREIGN PATENTS

| 840,101 | 1/1939 | France | 277—235A |
| 1,222,269 | 1/1960 | France | 277—140 |

ROBERT I. SMITH, Primary Examiner